United States Patent
Gaddis et al.

(10) Patent No.: US 9,778,883 B2
(45) Date of Patent: Oct. 3, 2017

(54) METHODS AND SYSTEMS FOR RESOURCE MANAGEMENT IN A NETWORKED STORAGE ENVIRONMENT

(71) Applicant: NETAPP, INC., Sunnyvale, CA (US)

(72) Inventors: Tony William Gaddis, Raleigh, NC (US); Jonathan Weinstock, Westford, MA (US); Curtis Hrishuk, Holly Springs, NC (US); Mark Wittle, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 191 days.

(21) Appl. No.: 14/747,395

(22) Filed: Jun. 23, 2015

(65) Prior Publication Data
US 2016/0380854 A1 Dec. 29, 2016

(51) Int. Cl.
G06F 15/173 (2006.01)
G06F 3/06 (2006.01)
H04L 29/08 (2006.01)
H04L 12/24 (2006.01)
H04L 12/26 (2006.01)

(52) U.S. Cl.
CPC ............ *G06F 3/067* (2013.01); *G06F 3/0604* (2013.01); *G06F 3/0653* (2013.01); *H04L 41/06* (2013.01); *H04L 43/0817* (2013.01); *H04L 67/1097* (2013.01); *H04L 43/16* (2013.01)

(58) Field of Classification Search
CPC ...... G06F 3/067; G06F 3/0653; G06F 3/0614; H04L 43/08; H04L 43/16; H04L 67/1097; H04L 41/06; H04L 41/0668; H04L 41/0663
See application file for complete search history.

(56) References Cited

U.S. PATENT DOCUMENTS

| | | | | |
|---|---|---|---|---|
| 7,206,863 B1* | 4/2007 | Oliveira | ................. | G06F 3/061 709/218 |
| 2006/0015773 A1* | 1/2006 | Singh | ................. | G06F 11/2046 714/13 |
| 2009/0150640 A1* | 6/2009 | Royer | ................. | G06F 9/5077 711/173 |
| 2012/0096039 A1* | 4/2012 | Lyle | ................. | G06F 17/30345 707/792 |
| 2012/0166731 A1* | 6/2012 | Maciocco | ............. | G06F 1/3275 711/130 |
| 2016/0077974 A1* | 3/2016 | Kim | ................. | G06F 12/0804 711/135 |

* cited by examiner

*Primary Examiner* — Nam Tran
(74) *Attorney, Agent, or Firm* — Klein, O'Neill & Singh, LLP

(57) ABSTRACT

Methods and systems for managing resources in a storage system are provided. As an example, one method includes determining a maximum node utilization of a first node operating in a networked storage environment for storing information at a plurality of storage devices, where the maximum node utilization is based on a first factor that tracks utilization of a processor of the first node; comparing the maximum node utilization to a first threshold value; and triggering an event when the maximum node utilization has reached the first threshold value.

18 Claims, 14 Drawing Sheets

METHODS AND SYSTEMS FOR RESOURCE MANAGEMENT IN A NETWORKED STORAGE ENVIRONMENT

TECHNICAL FIELD

The present disclosure relates to managing resources in a networked storage environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is a metric used in a storage environment to provide certain throughput for processing input/output (I/O) requests for reading or writing data, a response time goal within, which I/O requests are processed and a number of I/O requests processed within a given time (for example, in a second (IOPS). Throughput means amount of data transferred within a given time, for example, in megabytes per second (Mb/s).

To process an I/O request to read and/or write data, various resources are used within a storage system, for example, processors at storage system nodes, storage devices and others. The different resources perform various functions in processing the I/O requests. As storage systems continue to expand in size, complexity and operating speeds, it is desirable to efficiently monitor and manage resource usage. Continuous efforts are being made to better manage networked storage environments.

SUMMARY

In one aspect, a machine implemented method is provided. The method includes determining a maximum node utilization of a first node operating in a networked storage environment for storing information at a plurality of storage devices, where the maximum node utilization is based on a first factor that tracks utilization of a processor of the first node; comparing the maximum node utilization to a first threshold value; and triggering an event when the maximum node utilization has reached the first threshold value.

In another aspect, a non-transitory, machine readable storage medium having stored thereon instructions for performing a method is provided. The machine executable code which when executed by at least one machine, causes the machine to: determine a maximum node utilization of a first node operating in a networked storage environment for storing information at a plurality of storage devices, where the maximum node utilization is based on a first factor that tracks utilization of a processor of the first node; compare the maximum node utilization to a first threshold value; and trigger an event when the maximum node utilization has reached the first threshold value.

In yet another aspect, a system having a memory with machine readable medium comprising machine executable code having stored thereon instructions is provided. A processor module coupled to the memory is configured to execute the machine executable code to: determine a maximum node utilization of a first node operating in a networked storage environment for storing information at a plurality of storage devices, where the maximum node utilization is based on a first factor that tracks utilization of a processor of the first node; compare the maximum node utilization to a first threshold value; and trigger an event when the maximum node utilization has reached the first threshold value.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

Figure 1:
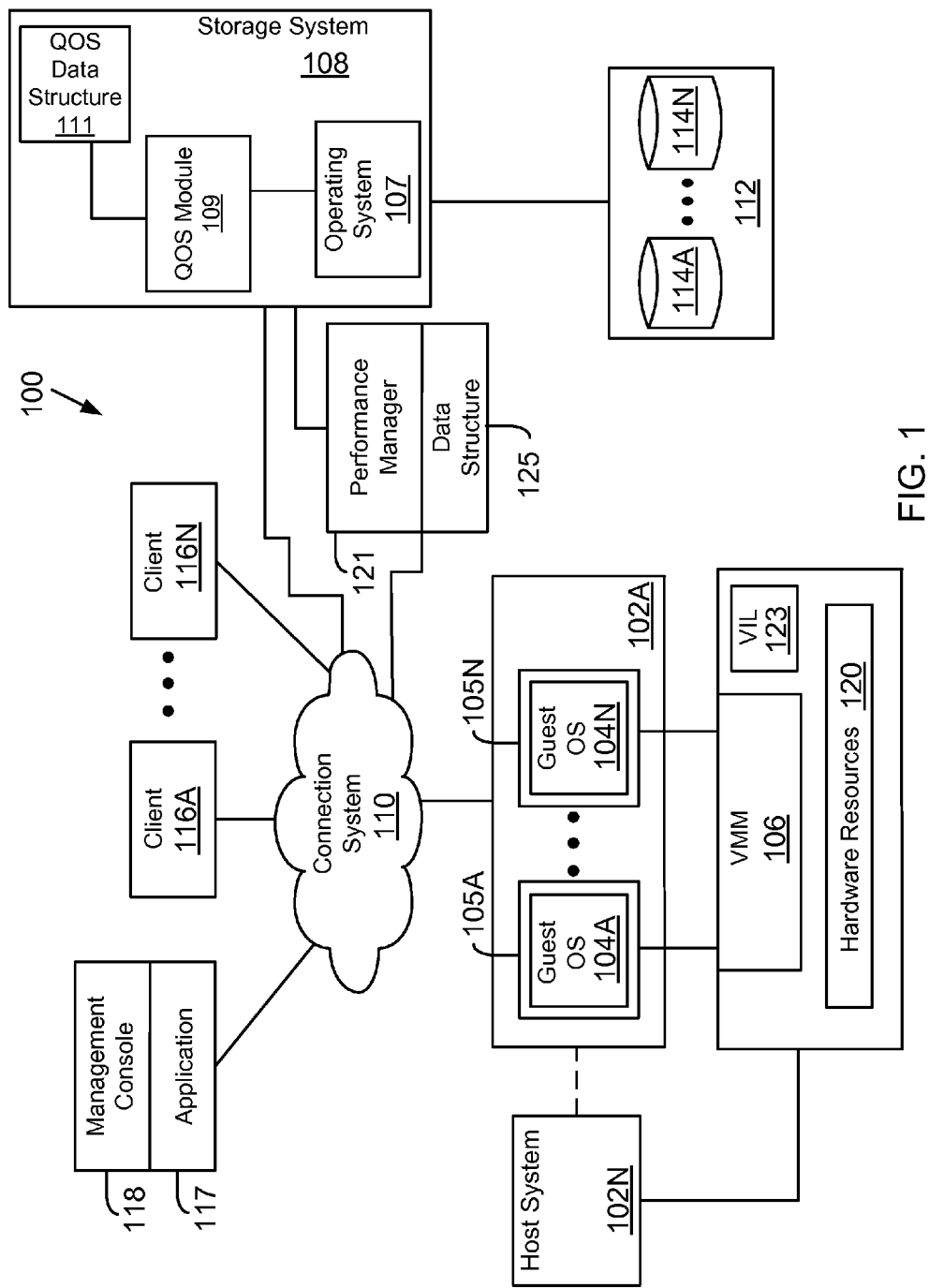
FIG. 1 shows an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, a performance manager module is provided that interfaces with a storage operating system to collect quality of service (QOS) data (or performance data) for various resources. QOS provides a certain throughput (i.e. amount of data that is transferred within a given time interval (for example, megabytes per seconds (MBS)), latency and/or a number of input/output operations that can be processed within a time interval, for example, in a second (referred to as IOPS). Latency means a delay in completing the processing of an I/O request and may be measured using different metrics for example, a response time in processing I/O requests.

In one aspect, methods and systems for managing resources in a storage system are provided. One method includes determining a maximum node utilization of a first node operating in a networked storage environment for storing information at a plurality of storage devices, where the maximum node utilization is based on a first factor that tracks utilization of a processor of the first node, a second factor that varies based on sequential and parallel operations executed by a storage operating system of the networked storage environment and a third factor that is based on a ratio of a duration for writing data to a non-volatile memory of the first node and a duration for flushing data from the non-volatile memory to the storage device; comparing the maximum node utilization to a first threshold value; and triggering an event when the maximum node utilization has reached the first threshold value.

System 100: FIG. 1 shows an example of a system 100, where the adaptive aspects disclosed herein may be implemented. System 100 includes a performance manager 121 that interfaces with a storage operating system 107 of a storage system 108 for receiving QOS data. The performance manager 121 may be a processor executable module that is executed by one or more processors out of a memory device.

The performance manager 121 obtains the QOS data and stores it at a local data structure 125. In one aspect, performance manager 121 analyzes the QOS data for detecting performance issues (that may be referred to as incidents) and identifying resources affected by performance issues. Details regarding the various operations performed by the performance manager 121 are provided below.

In one aspect, storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines (VMs) 105A-105N). A storage volume is a logical storage object and typically includes a file system in a NAS environment or a logical unit number (LUN) in a SAN environment. The various aspects described herein are not limited to any specific format in which physical storage is presented as logical storage (volume, LUNs and others)

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit. The QOS policy information may be stored at a QOS data structure 111 maintained by a QOS module 109. QOS at the storage system level may be implemented by the QOS module 109. QOS module 109 maintains various QOS data types that are monitored and analyzed by the performance manager 121, as described below in detail.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 executing via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102A includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102A with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1 may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels, where a client with a higher service level may be provided with more storage space than a client with a lower service level. A client at a higher level may also be provided with a certain QOS vis-à-vis a client at a lower level.

Figure 2A:
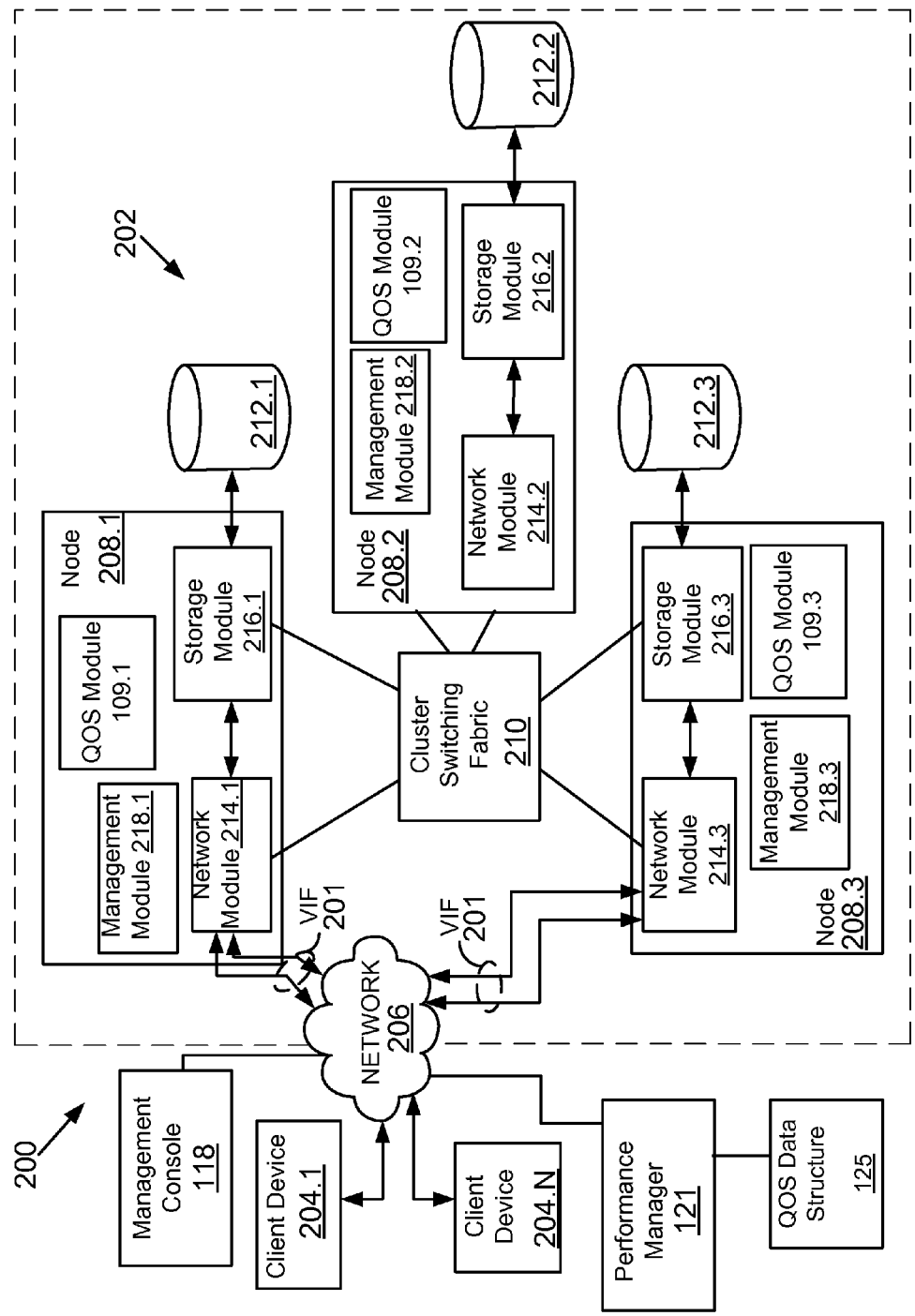
FIG. 2A shows an example of a clustered storage system, used according to one aspect of the present disclosure.

Although storage system 108 is shown as a stand-alone system, i.e. a non-cluster based system, in another aspect, storage system 108 may have a distributed architecture; for example, a cluster based system of FIG. 2A. Before describing the various aspects of the performance manager 121, the following provides a description of a cluster based storage system.

Clustered Storage System: FIG. 2A shows a cluster based storage environment 200 having a plurality of nodes for managing storage devices, according to one aspect. Storage environment 200 may include a plurality of client systems 204.1-204.N (similar to clients 116A-116N, FIG. 1), a clustered storage system 202, performance manager 121, management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114).

Each of the plurality of nodes 208.1-208.3 is configured to include a network module (maybe referred to as N-module), a storage module (maybe referred to as D-module), and a management module (maybe referred to as M-Module), each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N over the computer network 206, while the storage modules 216.1-216.3 connect to one or more of the storage devices 212.1-212.3. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212.

Each node may execute or interface with a QOS module, shown as 109.1-109.3 that is similar to the QOS module 109. The QOS module 109 may be executed for each node or a single QOS module may be used for the entire cluster. The aspects disclosed herein are not limited to the number of instances of QOS module 109 that may be used in a cluster. Details regarding QOS module 109 are provided below.

A switched virtualization layer including a plurality of virtual interfaces (VIFs) 201 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM has a client domain and a security domain that are separate from the client and security domains of other SVMs. Moreover, each SVM is associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Performance manager 121 interfaces with the various nodes and obtains QOS data for QOS data structure 125. Details regarding the various modules of performance manager are now described with respect to FIG. 2B.

Figure 2B:
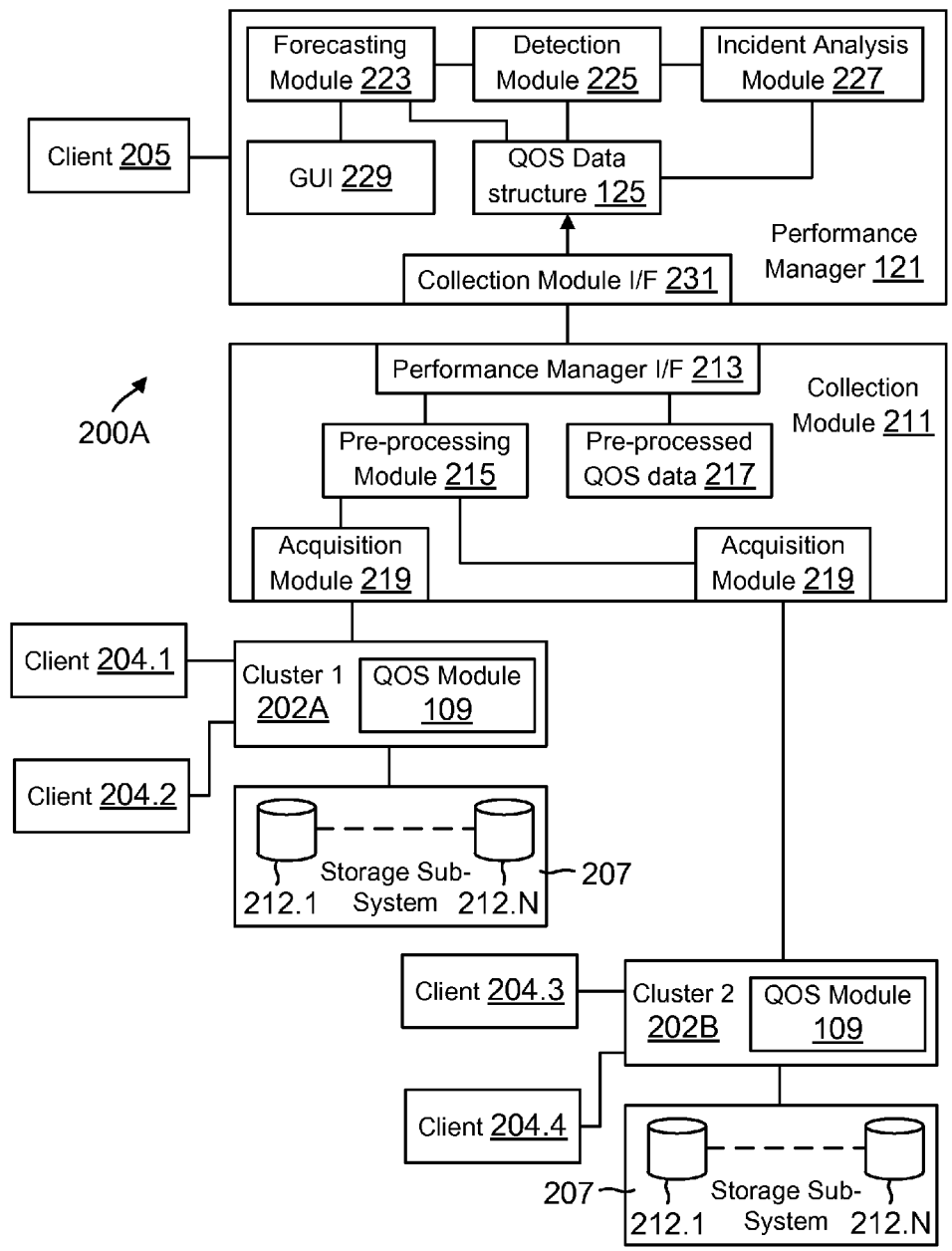
FIG. 2B shows an example of a performance manager, according to one aspect of the present disclosure.

Performance Manager 121: FIG. 2B shows a block diagram of system 200A with details regarding performance manager 121 and a collection module 211, according to one aspect. Performance manager 121 uses the concept of workloads for tracking QOS data for managing resource usage in a networked storage environment. At a high level, workloads are defined based on incoming I/O requests and use resources within storage system 202 for processing I/O requests. A workload may include a plurality of streams, where each stream includes one or more requests. A stream may include requests from one or more clients. An example, of the workload model used by performance manager 121 is shown in FIG. 2F and described below in detail.

Performance manager 121 collects a certain amount of data (for example, data for 3 hours or 30 data samples) of workload activity. After collecting the QOS data, performance manager 121 generates an expected range (or threshold values) for future QOS data.

The expected range is a range of measured performance activity (or QOS data) of a workload over a period of time. For example, a given twenty-four hour period may be split into multiple time intervals. The expected range may be generated for each time interval. The expected range sets a baseline for what may be perceived to be typical activity for the workload. The upper boundary of the expected range establishes a dynamic performance threshold that changes over time.

Performance manager 121 uses the expected range to represent and monitor I/O response time and operations for a storage volume in a cluster. The performance manager 121 tracks QOS data and in some cases identifies abnormal activity as incidents. An incident indicates that workload performance is outside a desirable level due to resource contention from other workloads i.e. workloads with higher usage of cluster resources may be causing the response time to increase. Incidents are considered as events that indicate I/O performance issues at a storage volume caused by resource contention.

Referring now to FIG. 2B, System 200A shows two clusters 202A and 202B, both similar to cluster 202 described above. Each cluster includes the QOS module 109 for implementing QOS policies that are established for different clients/applications. Cluster 1 202A may be accessible to clients 204.1 and 204.2, while cluster 2 202B is accessible to clients 204.3/204.4. Both clusters have access to storage subsystems 207 and storage devices 212.1/212.N.

Clusters 202A and 202B communicate with collection module 211. The collection module 211 may be a standalone computing device or integrated with performance manager 121. The aspects described herein are not limited to any particular configuration of collection module 211 and performance manager 121.

Collection module 211 includes one or more acquisition modules 219 for collecting QOS data from the clusters. The data is pre-processed by the pre-processing module 215 and stored as pre-processed QOS data 217 at a storage device (not shown). Pre-processing module 215 formats the collected QOS data for the performance manager 121. Pre-processed QOS data 217 is provided to a collection module interface 231 of the performance manager 121. QOS data received from collection module 211 is stored as QOS data structure 125 by performance manager 121 at a storage device (not shown).

Performance manager 121 includes a plurality of modules, for example, a forecasting module 223, a detection module 225 and an incident analysis module 227 that use the QOS data 125 for detecting incidents and reporting the incidents to a client system 205 via a GUI 229. The forecasting module 223 predicts threshold values, while detection module detects when the threshold values are reached. Incident module 227 analyzes events and provides corrective action. Client 205 may access the analysis results and recommendations using GUI 229. Before describing the various processes involving performance manager 121 and its components, the following provides an overview of QOS, as used by the various aspects of the present disclosure.

Figure 2C:
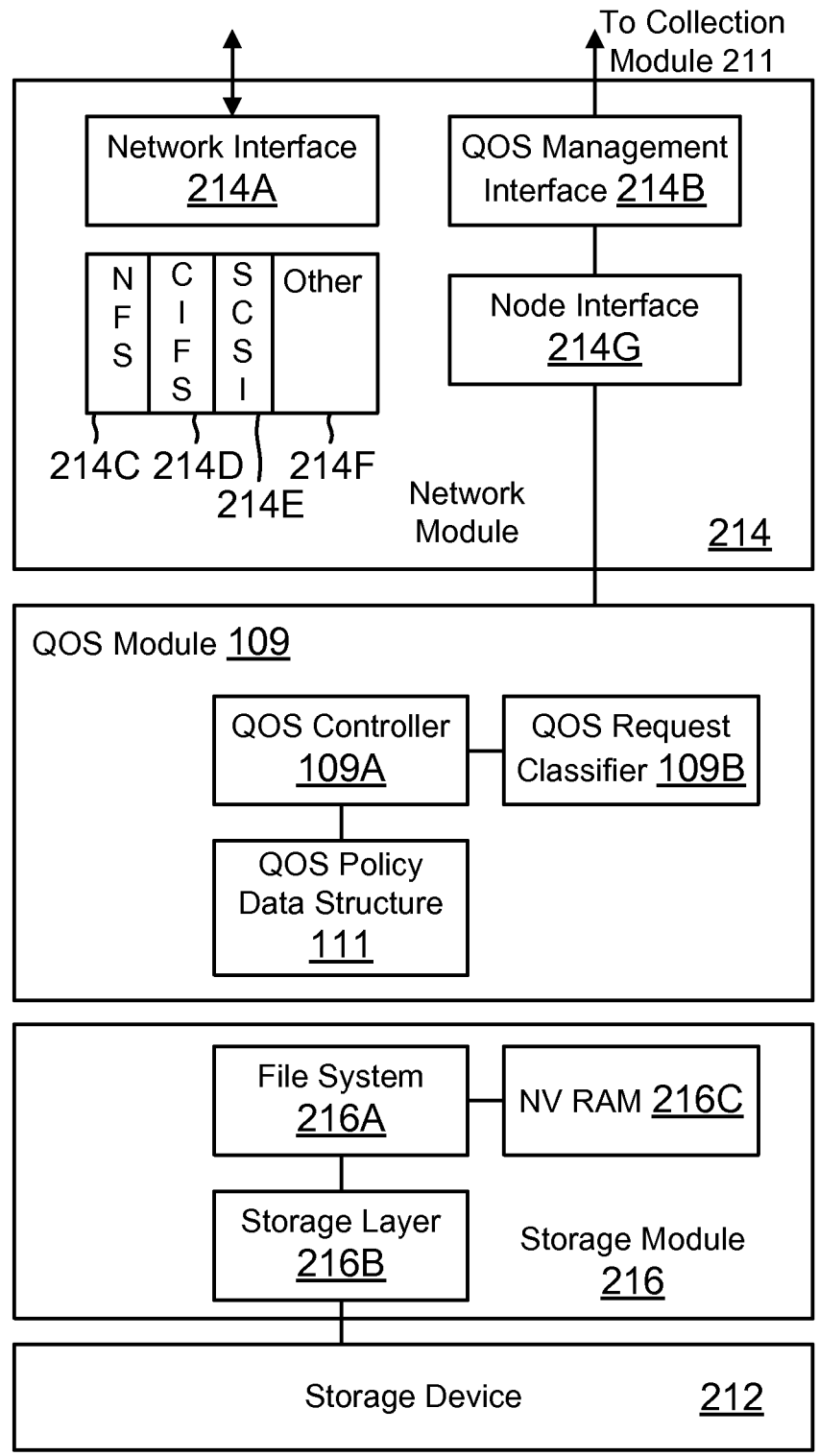
FIG. 2C shows an example of handling QOS requests by a storage system, according to one aspect of the present disclosure.

QOS Overview: As shown in FIG. 2C, the network module 214 of a cluster includes a network interface 214A for receiving requests from clients. Network module 214 executes a NFS module 214C for handling NFS requests, a CIFS module 214D for handling CIFS requests, a SCSI module for handling iSCSI requests and an others module 214F for handling "other" requests. A node interface 214G is used to communicate with QOS module 109, storage module 216 and/or another network module 214. QOS management interface 214B is used to provide QOS data from the cluster to collection module 211 for pre-processing data.

QOS module 109 includes a QOS controller 109A, a QOS request classifier 109B and QOS policy data structure (or Policy_Group) 111. The QOS policy data structure 111 stores policy level details for implementing QOS for clients and storage volumes. The policy determines what latency and throughput rate is permitted for a client as well as for specific storage volumes. The policy determines how I/O requests are processed for different volumes and clients.

The storage module 216 executes a file system 216A (a part of storage operating system 107 described below) and includes a storage layer 216B to interface with storage device 212.

NVRAM 216C of the storage module 216 may be used as a cache for responding to I/O requests. In one aspect, for executing a write request, the write data associated with the write request is first stored at a memory buffer of the storage module 216. The storage module 216 acknowledges that the write request is completed after it is stored at the memory buffer. The data is then moved from the memory buffer to the NVRAM 216C and then flushed to the storage device 212, referred to as consistency point (CP).

An I/O request arrives at network module 214 from a client or from an internal process directly to file system 216A. Internal process in this context may include a de-duplication module, a replication engine module or any other entity that needs to perform a read and/or write operation at the storage device 212. The request is sent to the QOS request classifier 109B to associate the request with a particular workload. The classifier 109B evaluates a request's attributes and looks for matches within QOS policy data structure 111. The request is assigned to a particular workload, when there is a match. If there is no match, then a default workload may be assigned.

Once the request is classified for a workload, then the request processing can be controlled. QOS controller 109A determines if a rate limit (i.e. a throughput rate) for the request has been reached. If yes, then the request is queued for later processing. If not, then the request is sent to file system 216A for further processing with a completion deadline. The completion deadline is tagged with a message for the request.

File system 216A determines how queued requests should be processed based on completion deadlines. The last stage of QOS control for processing the request occurs at the physical storage device level. This could be based on latency with respect to storage device 212 or overall node capacity/utilization as described below in detail.

Figure 2D:
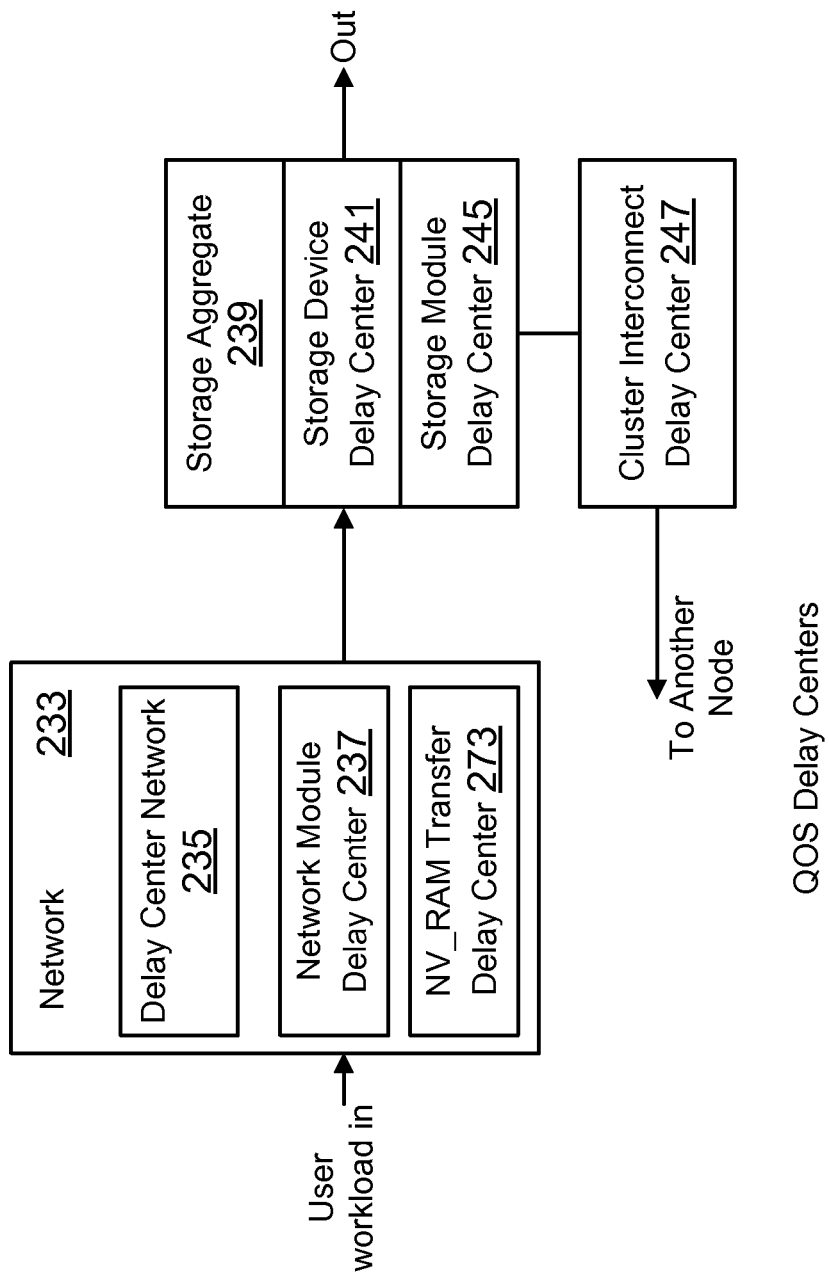
FIG. 2D shows an example of a resource layout used by the performance manager, according to one aspect of the present disclosure.

Performance Model: FIG. 2D shows an example of a queuing network used by the performance manager 121 for detecting and trouble shooting performance issues, according to one aspect. A user workload enters the queuing network from one end (i.e. at 233) and leaves at the other end.

Various resources are used to process I/O requests. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, the QOS data includes a number of visits, wait time per visit and service time per visit for incident detection and analysis. For the delay center, only the number of visits and the wait time per visit at the delay center are used, as described below in detail.

Performance manager 121 uses different flow types for its analysis. A flow type is a logical view for modeling request processing from a particular viewpoint. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

Referring now to FIG. 2D, delay center network 235 is a resource queue that is used to track wait time due to external networks. Storage operating system 107 often makes calls to external entities to wait on something before a request can proceed. Delay center 235 tracks this wait time.

Network module delay center 237 is another resource queue where I/O requests wait for protocol processing by a network module processor. This delay center 237 is used to track the utilization/capacity of the network module 216. Overutilization of this resource may cause latency, as described below in detail.

NV_RAM transfer delay center 273 is used to track how the non-volatile memory may be used by cluster nodes to store write data before, the data is written to storage devices 212, in one aspect, as described below in detail.

A storage aggregate (or aggregate) 239 is a resource that may include more than one storage device for reading and writing information. Aggregate 239 is tracked to determine if the aggregate is fragmented and/or over utilized, as described below in detail.

Storage device delay center 241 may be used to track the utilization of storage devices 212. In one aspect, storage device utilization is based on how busy a storage device may be in responding to I/O requests.

In one aspect, storage module delay center 245 is used for tracking node utilization. Delay center 245 is tracked to monitor the idle time for a CPU used by the storage module 216, the ratio of sequential and parallel operations executed by the CPU and a ratio of write duration and flushing duration for using NVRAM 216C or an NVRAM at the storage module (not shown).

Nodes within a cluster communicate with each other. These may cause delays in processing I/O requests. The cluster interconnect delay center 247 is used to track the wait time for transfers using the cluster interconnect system. As an example, a single queue maybe used to track delays due to cluster interconnects.

There may also be delay centers due to certain internal processes of storage operating system 107 and various queues may be used to track those delays. For example, a queue may be used to track the wait for I/O requests that may be blocked for file system reasons. Another queue (Delay_Center_Susp_CP) may be used to represent the wait time for Consistency Point (CP) related to the file system 216A. During a CP, write requests are written in bulk at storage devices and this will typically cause other write requests to be blocked so that certain buffers are cleared.

Figure 2E:
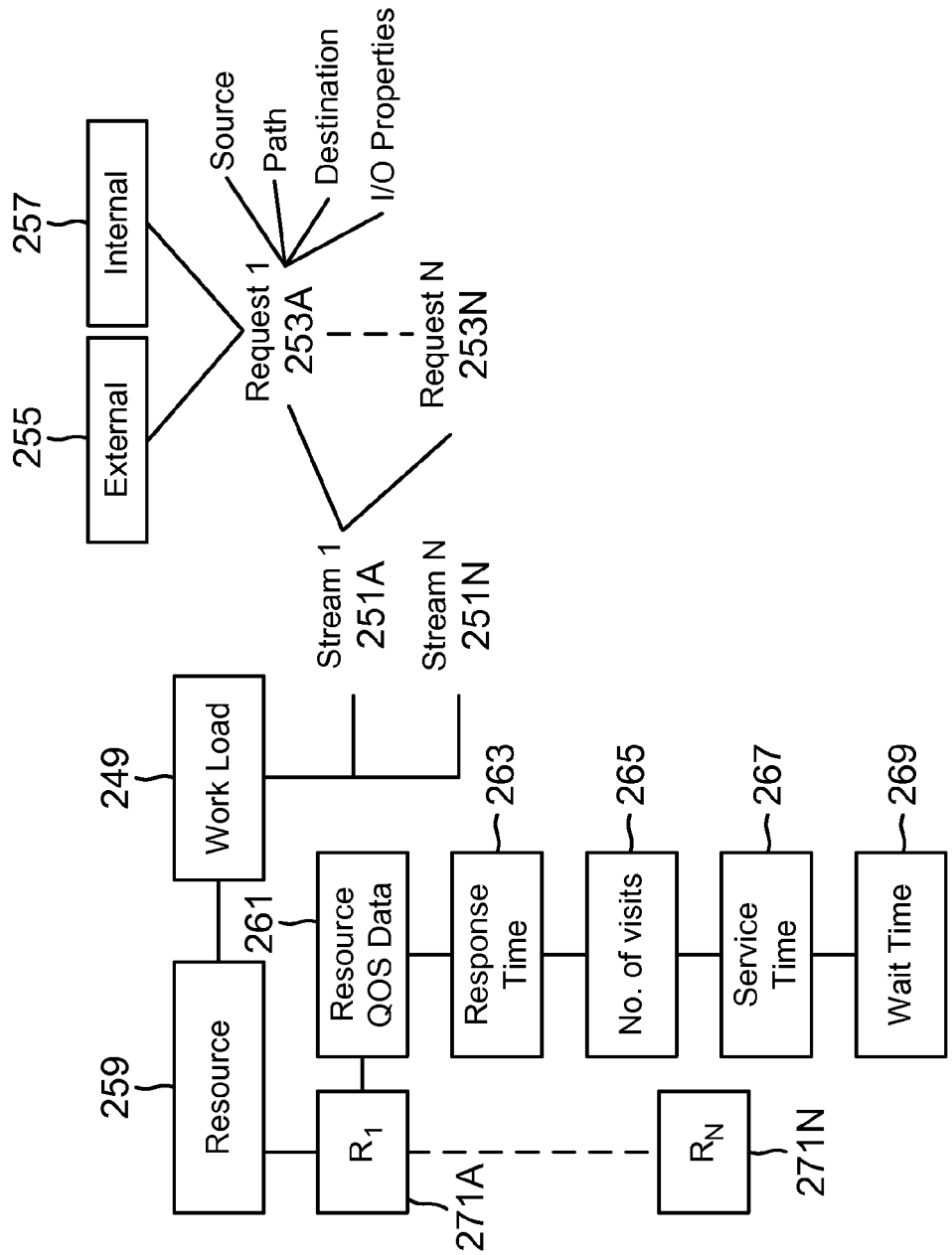
FIG. 2E shows an example of managing workloads and resources by the performance manager, according to one aspect of the present disclosure.

Workload Model: FIG. 2E shows an example, of the workload model used by performance manager 121, according to one aspect. As an example, a workload may include a plurality of streams 251A-251N. Each stream may have a plurality of requests 253A-253N. The requests may be generated by any entity, for example, an external entity 255, like a client system and/or an internal entity 257, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol. A destination is the target of a request, for example, storage volumes, LUNs, data containers and others. I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload. Furthermore, requests that fall into a workload are tracked together by performance 121 for efficiency. Any requests that don't match a user or system defined workload may be assigned to a default workload.

In one aspect, workload streams may be defined based on the I/O attributes. The attributes may be defined by clients. Based on the stream definition, performance manager 121 tracks workloads, as described below.

Referring back to FIG. 2E, a workload uses one or more resources for processing I/O requests shown as 271A-271N as part of a resource object 259. The resources include service centers and delay centers that have been described above with respect to FIG. 2D. For each resource, a counter/queue is maintained for tracking different statistics (or QOS data) 261. For example, a response time 263, and a number of visits 265, a service time (for service centers) 267 and a wait time 269 are tracked. The term QOS data as used throughout this specification includes one or more of 263, 265, 267 and 269 according to one aspect.

Performance manager 121 may use a plurality of counter objects for resource monitoring, according to one aspect. Without limiting the various adaptive aspects, an example of the various counter objects are shown and described in Table I below:

TABLE I

| Workload Object Counters | Description |
| --- | --- |
| OPS | A number of workload operations that are completed during a measurement interval, for example, a second. |
| Read_ops | A number of workload read operations that are completed during the measurement interval. |
| Write_ops | A number of workload write operations that are completed during the measurement interval. |
| Total_data | Total data read and written per second by a workload. |
| Read_data | The data read per second by a workload. |
| Write_data | The data written per second by a workload. |
| Latency | The average response time for I/O requests that were initiated by a workload. |
| Read_latency | The average response time for read requests that were initiated by a workload. |
| Write_latency | The average response time for write requests that were initiated by a workload. |
| Latency_hist | A histogram of response times for requests that were initiated by a workload. |
| Read_latency_hist | A histogram of response times for read requests that were initiated by a workload. |
| Write_latency_hist | A histogram of response times for write requests that were initiated by a workload. |
| WID | A workload ID. |
| Classified | Requests that were classified as part of a workload. |
| Read_IO_type | The percentage of reads served from various components (for example, buffer cache, ext_cache or disk). |
| Concurrency | Average number of concurrent requests for a workload. |
| Interarrival_time_sum_squares | Sum of the squares of the Inter-arrival time for requests of a workload. |
| Policy_group_name | The name of a policy-group of a workload. |
| Policy_group_uuid | The UUID (unique indetifier) of the policy-group of a workload. |
| Data_object_type | The data object type on which a workload is defined, for example, one of SVM, volume, LUN, file or node. |
| Data_object_name | The name of a lowest-level data object, which is part of an instance name as discussed above. When data_object_type is a file, this will be the name of the file relative to its volume. |
| Data_object_uuid | The UUID (Unique Universal ID) of a SVM, volume or LUN on which this data object is defined. |

TABLE I-continued

| Workload Object Counters | Description |
| --- | --- |
| Data_object_file_handle | The file handle of the file on which this data object is defined; or empty if data_object_type is not a file. |

Without limiting the various aspects of the present disclosure, Table II below provides an example of the details associated with the object counters that are monitored by the performance manager 121, according to one aspect:

TABLE II

Workload Detail

| Object Counter | Description |
| --- | --- |
| Visits | A number of visits to a physical resource per second; this value is grouped by a service center. |
| Service_Time | A workload's average service time per visit to the service center. |
| Wait_Time | A workload's average wait time per visit to the service center. |

Figure 3:
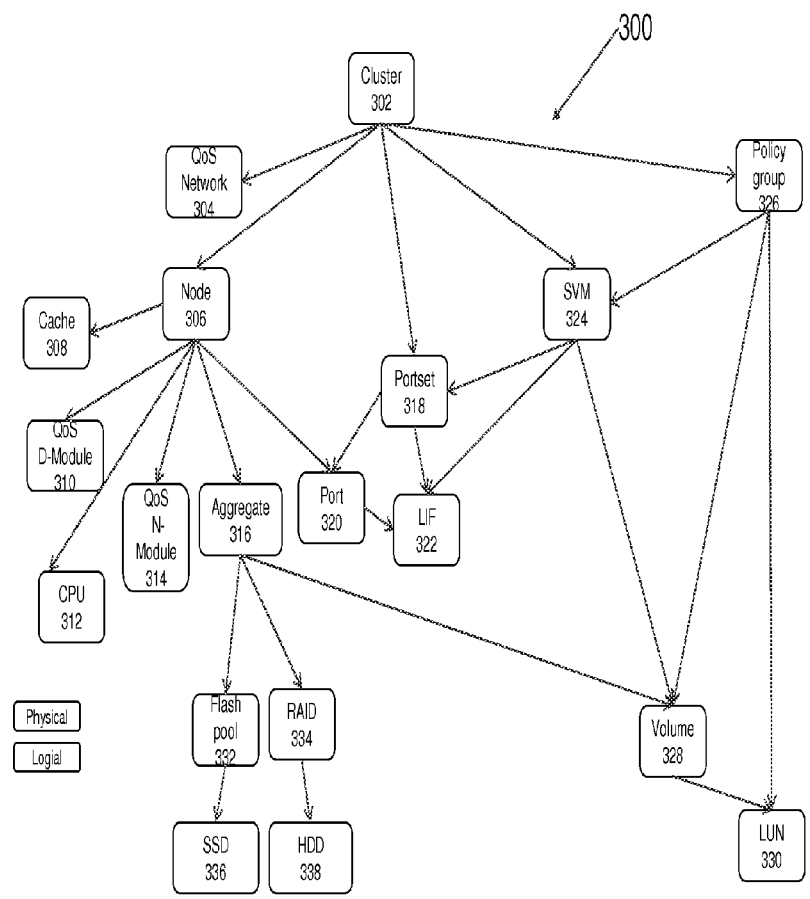
FIG. 3 shows a format for managing various resource objects, according to one aspect of the present disclosure.

Object Hierarchy: FIG. 3A shows a format 300 for tracking information regarding different resources that are used within a clustered storage system (for example, 200, FIG. 2A). Format 300 is hierarchical in nature where various objects may have parent-child, peer and remote peer relationships, as described below. As an example, format 300 shows a cluster object 302 that may be categorized as a root object type. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module, a CPU object 312 and an aggregate object 316. The cache object 308 is used to track utilization of a cache (for example, NVRAM 216C, FIG. 2D). The QOS storage module 310 tracks the QOS of a storage module defined by a QOS policy data structure 111 described above in detail with respect to FIG. 2D. The QOS network module object 314 tracks the QOS for a network module. The CPU object 312 is used to track CPU performance and utilization of a node.

The aggregate object 316 tracks the utilization of a storage aggregate that is managed by a cluster node. The aggregate object may have various child objects, for example, a flash pool object 332 that tracks usage of a plurality of flash based storage devices (shown as "flash pool"). The flash pool object 332 may have a SSD disk object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a LIF object 322. The LIF object 322 includes a logical interface, for example, an IP address, while the port object 320 includes a port identifier for a port, for example, a world-wide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (red, write or read and write) and other information.

Figure 4:
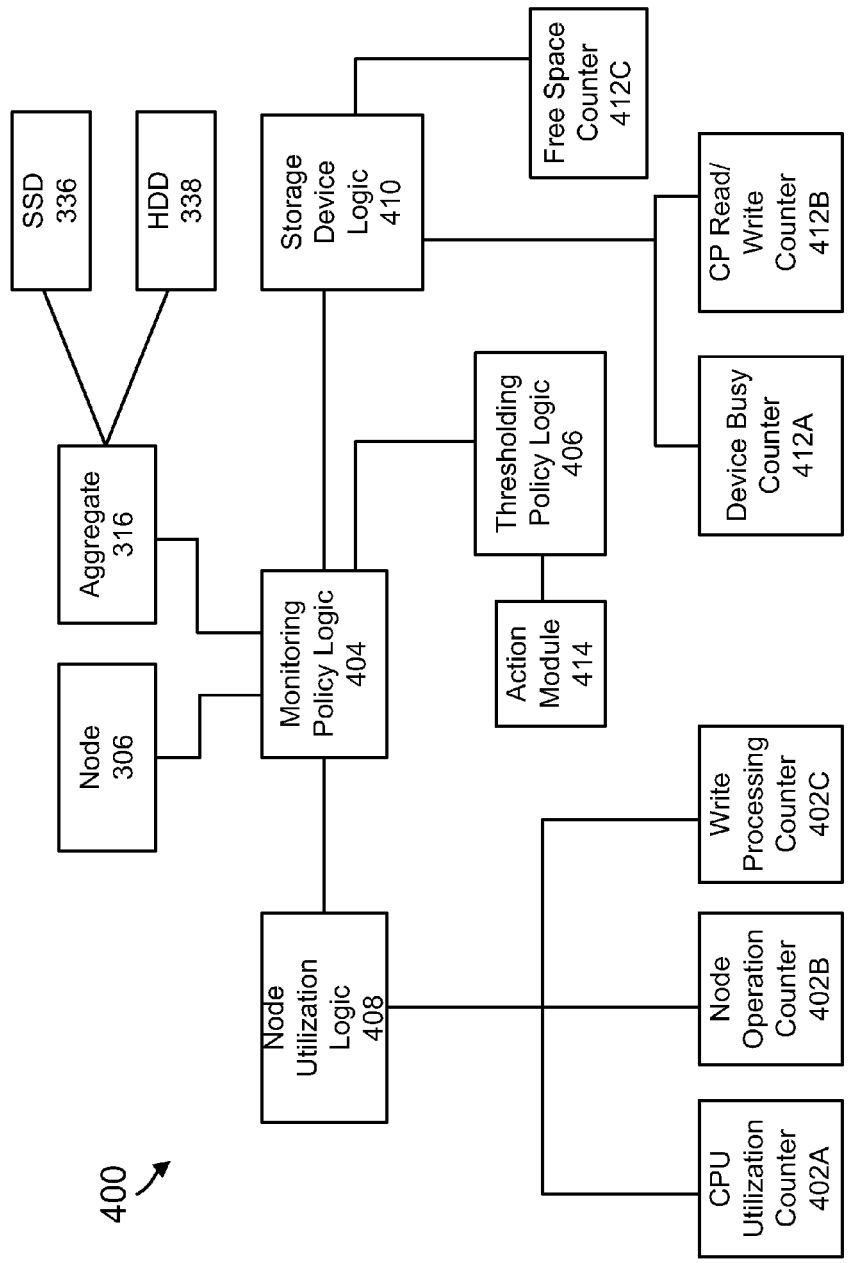
FIG. 4 shows an example an architecture used for tracking node and storage device utilization, according to one aspect of the present disclosure.

Architecture: FIG. 4A shows an example of an architecture 400 that is used for effectively detecting performance issues that may be based on node and storage device resources, according to one aspect. Architecture 400 is maintained by the performance manager 121.

In one aspect, a resource object, for example, node 306 and aggregate 316 is monitored using monitoring policy logic 404. The monitoring policy logic 404 is used to establish parameters for monitoring resources. For example, policy logic 404 defines how much and what type of data is to be collected for a resource. The data is collected using various counters 402A-402C and 412A-412C, as described below in detail.

Threshold logic 406 provides threshold values for a resource that is being monitored, as described below in detail. When the threshold is reached, then action module 414 triggers an event notifying a user.

In one aspect, architecture 400 includes node utilization logic 408 and storage device utilization logic 410 that monitor node 306 and aggregate 332, according to one aspect. The functionality and processes executed by logic 408 and 410 are described below in detail with respect to the various process flow diagrams.

In one aspect, to track utilization of a node via node object 306, the performance manager may look at a plurality of factors. For example, a first factor, may be based on a percentage of time the processors at a node are running in an "idle loop". Modern processors typically use idle time to save power. If a processor does not have any idle time it indicates that the processor is extremely busy. Information to track the first factor is based on CPU utilization counter 402A that is maintained by each node having a network and storage module. Counter 402A tracks the idle time for the CPUs of network and storage modules.

A second factor for tracking node utilization is based on the complexity of the operations that are performed by the storage operating system 107. For example, some operations that are performed by the storage operating system 107 may be sequential, while others are performed in parallel. In one aspect, the wait times for sequential and parallel operations are tracked to evaluate node utilization. Counter 402B may be used to monitor the wait times for sequential and parallel operations. Counter 402B may be located at both the network and storage modules and performance manager 121 may obtain the counter information from the nodes.

A third factor for monitoring node utilization is based on the use of memory by the processors of the nodes. The memory is referred to as "NV-RAM" transfer delay center 273. For processing write requests, data is written to the NVRAM and later flushed (or moved) to persistent storage 212. Thus the node processors write to the NVRAM and flush the data out of the NVRAM. The third factor tracks the duration for writing to the NVRANM and flushing data out of the NVRAM. Counter 402C is used to track the NVRAM associated durations.

Storage device logic 410 tracks storage device utilization for each storage device and storage aggregate using the delay centers 239 and 241. In one aspect, logic 410 tracks the amount of time a storage device in an aggregate is busy performing an operation. This metric represents operations that are queued for a storage device in an aggregate. When operations are queued at a storage device, it impacts latency. Counter 412A shown as "device-busy" may be used to track how busy a storage device maybe at any given time.

When the storage device utilization is at an undesirable level, in one aspect, a first factor that depends on the layout of a storage device in an aggregate is analyzed. The first factor tracks the ratio of write operations to consistency point reads for a storage device. To write data, a node uses buffers at a memory (for example, 704, FIG. 7) to initially stage the data. The node then acknowledges the write operation. Data from the memory buffers is moved to a NVRAM and then written persistently to a storage device. The active file system pointers are updated after the write operation to the storage device are completed. Once the data is written to the storage device, the NVRAM is cleared. The process of writing the data to the storage device and updating the pointers is referred to as CP or consistency point. Counter 412B is used to track the read/write ratio.

A third factor that is based on an amount of free space at a storage device is used to analyze storage device utilization. When the second factor is below a certain level, then the storage device/aggregate is considered fragmented. Counter 412C is used to track the free space at an aggregate, at any given time.

In one aspect, latency and throughput may have a relationship similar to the shape of a hockey stick having a blade and a handle. Latency may be assumed to be acceptable when it lies on the blade and undesirable when it is on the handle. When latency lies on the handle, it may be due to overuse of the resources in a system which may cause undesirable queueing and wait times. In one aspect, the node and storage device resources may be utilized beyond a certain level resulting in undesirable latency. The various aspects described herein analyze both node and storage device utilization for managing latency due to these resources.

Figure 5A:
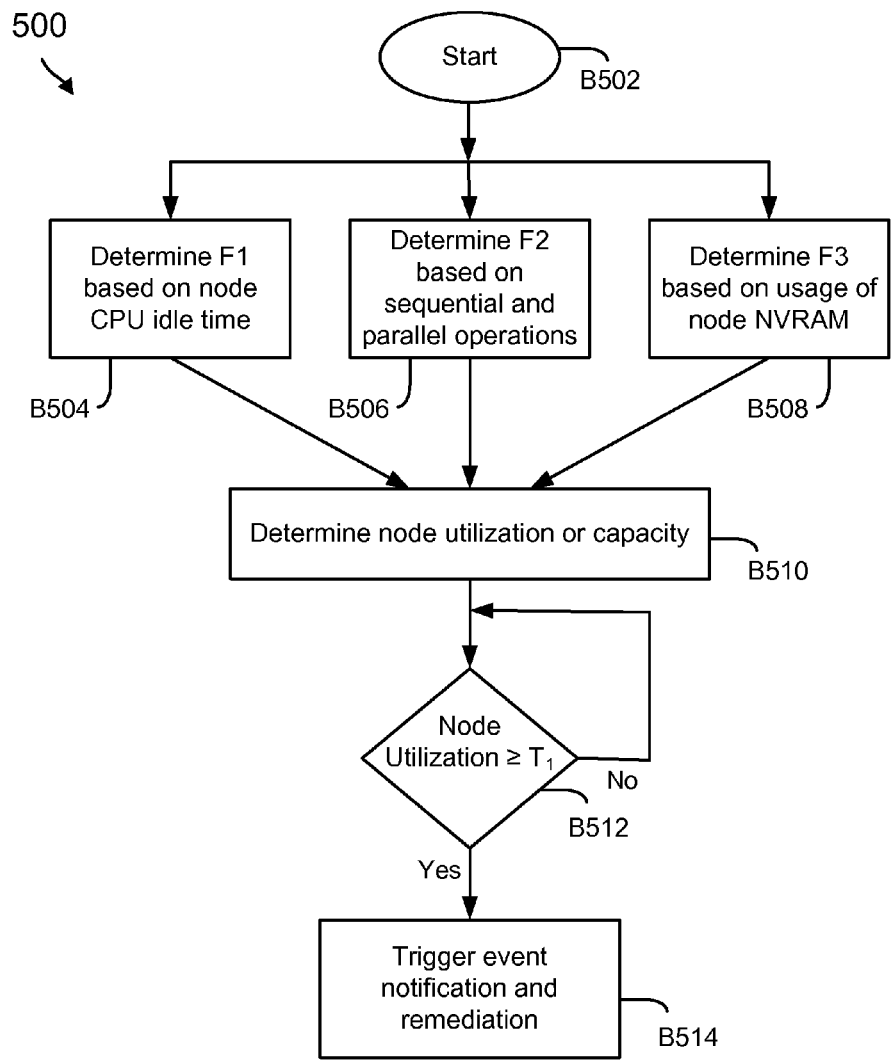
FIGS. 5A-5B show process flows for determining node utilization, according to one aspect of the present disclosure.

Process Flows: FIG. 5A shows a machine executable process 500 for analyzing node utilization that may result in unacceptable latency, according to one aspect of the present disclosure. Process 500 may be executed by a processor of the performance manager 121 based on data collected for counters 402A-402C (FIG. 4), according to one aspect. The process begins in block B502, when a storage system is operational. Data associated with storage system nodes and the counters has been collected.

In one aspect, in block B504, a first factor, F1 is determined by the performance manger 121 based on counter 402A data. In one aspect, F1 is determined by tracking an idle time of the node processors. This information is tracked by counter 402A at each storage system node and then periodically provided to the performance manager 121.

In block B506, a second factor, F2 is determined. F2 is based on a ratio of sequential and parallel operations that are tracked by counter 402B. This information is maintained by each storage system node that executes the various sequential and parallel operations. F2 affects latency because if the wait time for a sequential operation is high, then it may affect the time it takes to execute other sequential and/or parallel operations.

In block B508, the process determines a third factor, F3 that is based on the ratio of writing to a node's NVRAM versus flushing the NVRAM to persistence storage. This data is maintained by counter 402C at each storage system node. The counter tracks the duration for writing to the NVRAM and the duration for flushing the NVRAM. The information is then reported to the performance manager 121. F3 also affects latency because, if too much time is being spent for flushing, then it may increase the latency for executing write operations.

In block B510, the performance manager 121 determines a node's capacity or utilization, at any given time. This is determined based on a maximum value of F1, F2 and F3 for each node. In one aspect, a weighted approach may be used to determine the node capacity, where the appropriate weight to the factors may be assigned based on an operating environment.

In block B512, the node utilization is compared with a first threshold value T1. The first threshold value may be a percentage value, for example, 85%. In one aspect, the first threshold value is configurable. If the node utilization has reached T1, then a notification may be triggered for a user in block B514. The notification may be reassign workloads for a node so that node utilization may be below the threshold value.

If node utilization does not reach T1, then no action is taken and the process simply loops and waits for comparing a next node utilization value.

By alerting the user of node overutilization, latency is better managed because action can be taken to reduce node utilization.

Figure 5B:
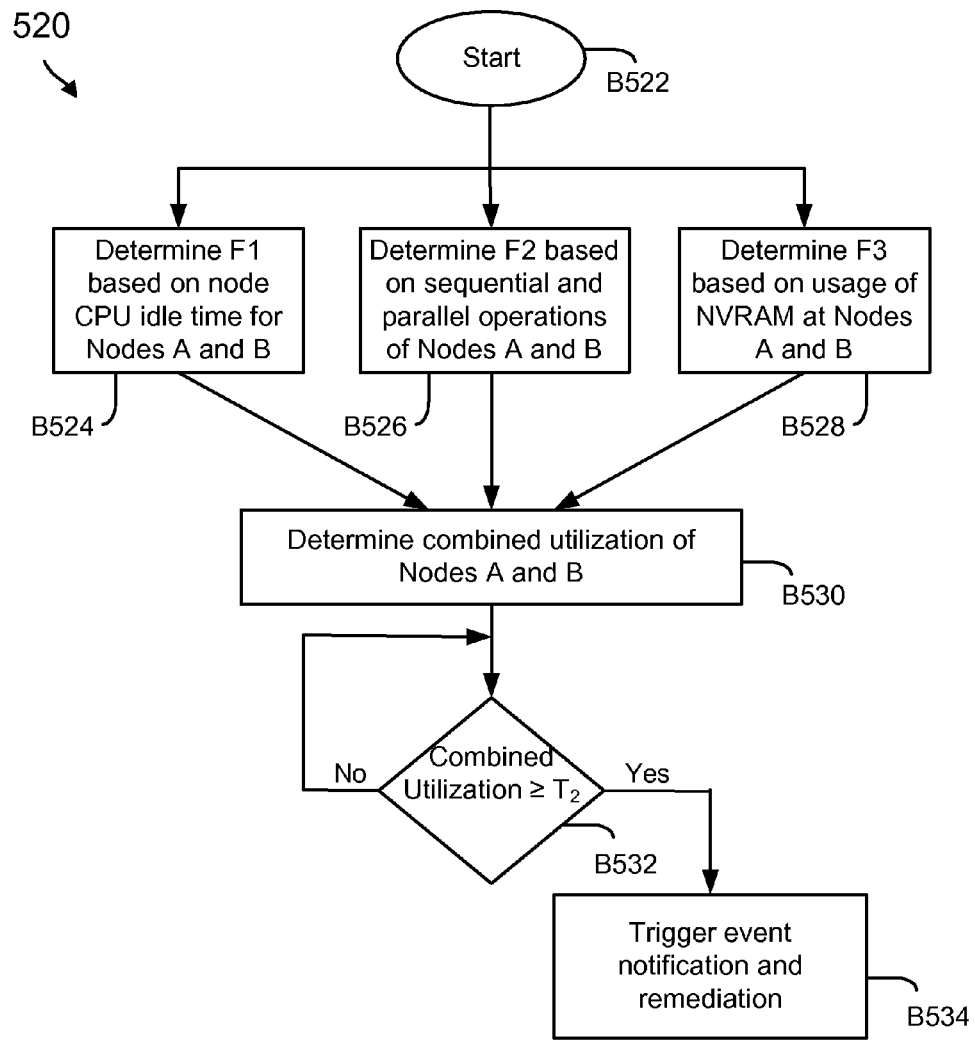

FIG. 5B shows a process 520 for determining node utilization, when at least two nodes are configured to operate as "high availability" (HA) pair nodes (may be referred to as Node A and Node B). Each HA node may take over the operations of the other node, when the other node fails. The process begins in block B522 when data for counters 402A-402C has been collected by the performance manager 121.

In blocks B524, B526 and B528, the performance manager 121, executing machine executable instructions determine factors F1, F2 and F3 for each node. Process blocks are similar to blocks B504, B506 and B508, described above in detail with respect to FIG. 5A.

In block B530, the combined node utilization (or capacity) of both the nodes is determined. The total node utilization for the HA pair is compared to a second threshold value (T2) in block B532. As an example, T2 may be 100%. If the total node utilization has reached T2, then an event is triggered in block B534 notifying the user of the overutilization. Once again, the user may move workloads and make configuration changes to reduce node overutilization.

Figure 6A:
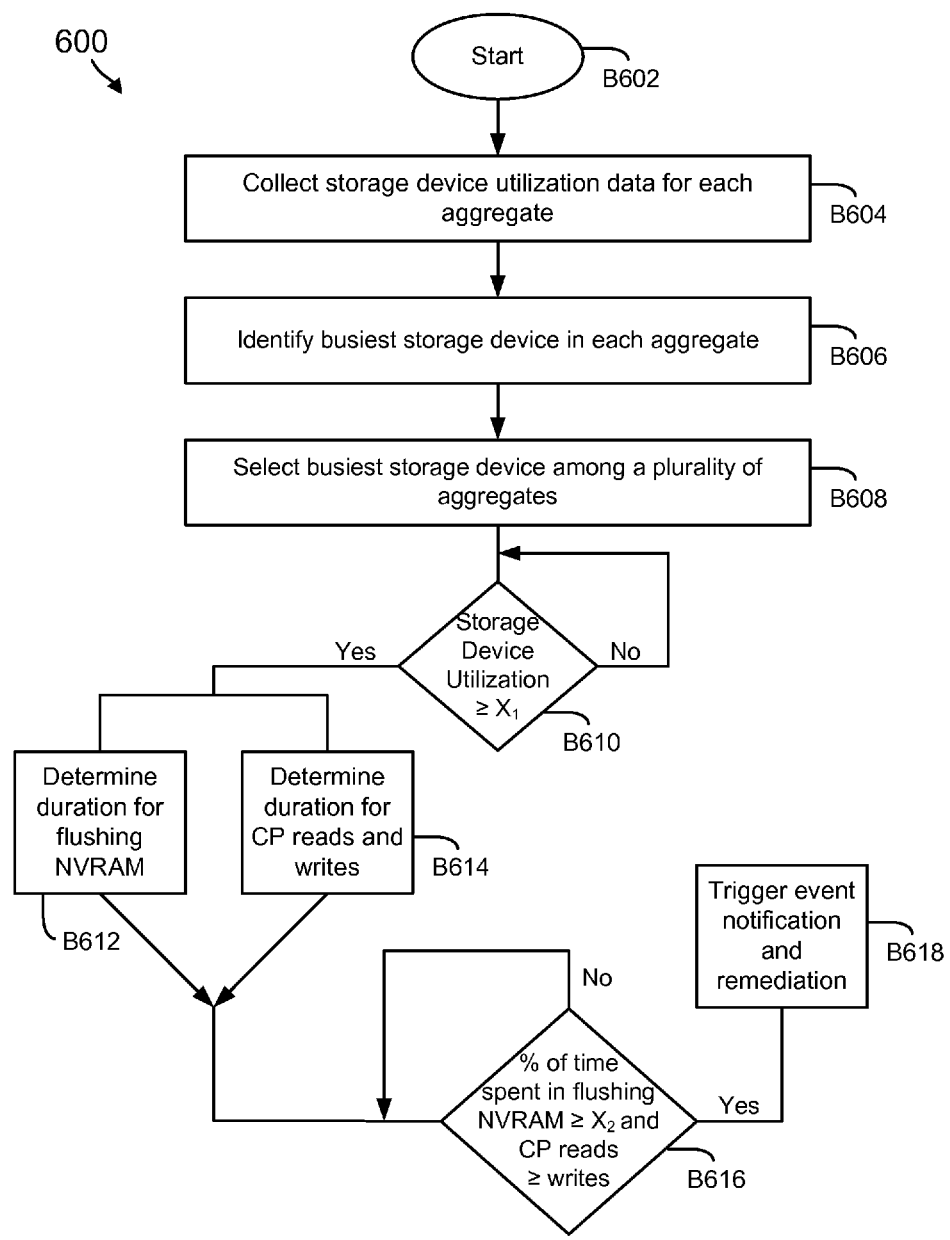
FIGS. 6A-6B show process flows for determining storage device utilization, according to one aspect of the present disclosure.

FIG. 6A shows a process 600 for evaluating storage device fragmentation in an aggregate, according to one aspect. The process begins in block B602, when various storage devices in a plurality of aggregates are operational.

In block B604, the storage system nodes collect data for each storage device in an aggregate to determine storage device utilization. In one aspect, storage device utilization is based on a percent of time a storage device is busy executing an operation. This may be based on counter 412A that is maintained by each node managing an aggregate within a cluster. The utilization value is provided to performance manger 121. The performance manager 121 executing machine executable code then identifies the busiest storage device of each aggregate, in block B606.

In block B608, the busiest storage device from among a plurality of aggregates is identified. The storage device utilization is then compared to a first threshold value, X1, in block B610. As an example, the threshold value may be 50% or any other value that may be specified by a user.

If the storage device utilization has reached X1, then in block B612, the performance manager 121 determines the duration for flushing or cleaning the NVRAM. The duration may be a percentage of the overall time the NVRAM is used. This information is based on counter 402A that is maintained to track the duration for the overall use of the NVRAM and the time it takes to flush data from the NVRAM. Simultaneously, in block B614, the process determines the ratio of CP reads and write operations. This value is based on counter 412B that is maintained by the storage system nodes.

In block B616, the performance manager 121 determines if the time spent to clean the NVRAM has reached the threshold value of X2 and the duration for CP reads exceed the writes. If yes, then in block B618, an event is triggered, notifying the user that the storage device is fragmented. The user may then configure a new storage device or move I/O requests to another device that is underutilized.

Figure 6B:
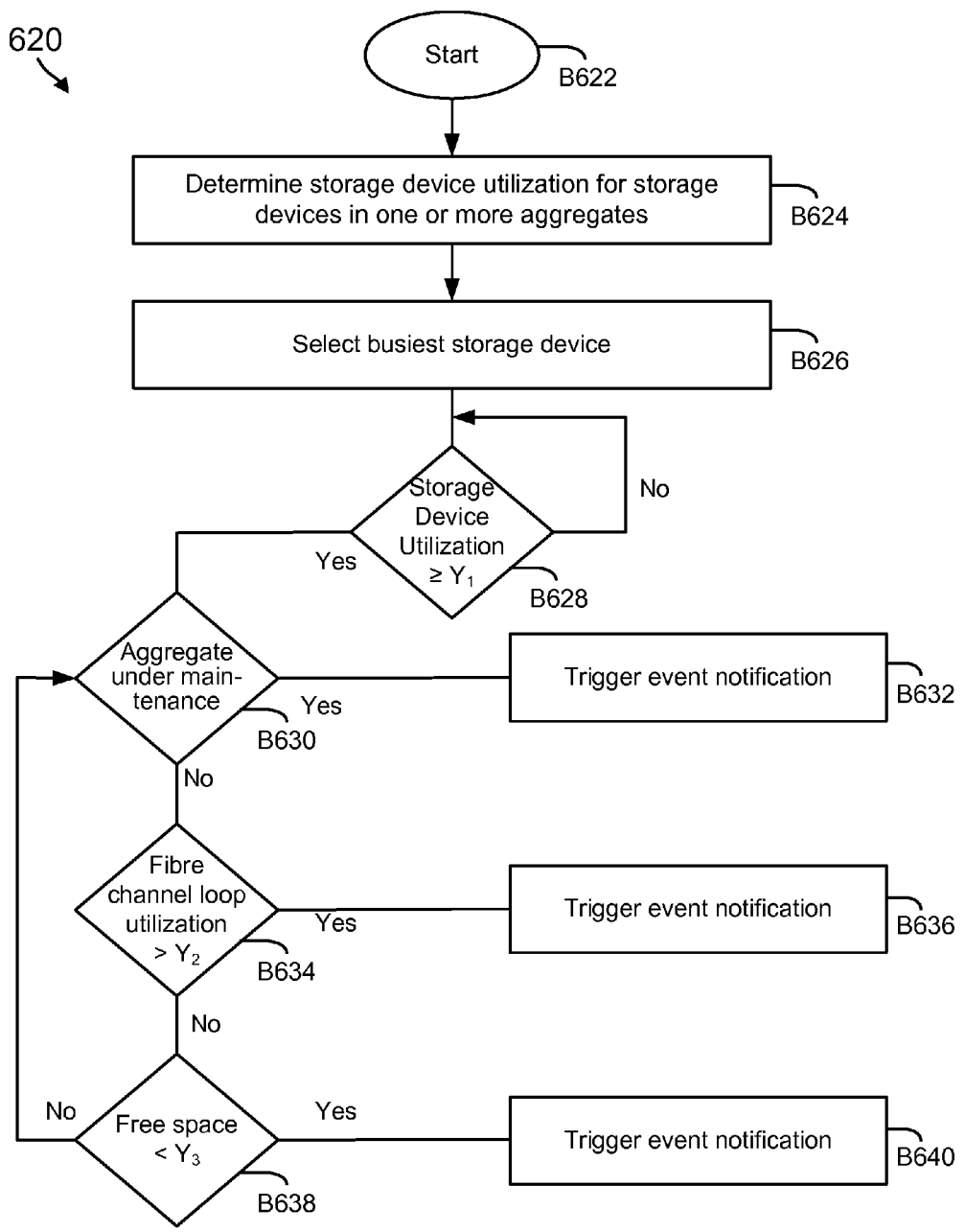

FIG. 6B shows a process 620 for analyzing aggregate utilization, according to one aspect of the present disclosure. The process begins in block B622 when various nodes and storage devices of a plurality of aggregates are operational. In block B624, storage device utilization for each storage device at one or more aggregate is determined. This is determined from counter 412A maintained for each storage system node. The storage device utilization for each storage device is provided to the performance manager 121. A storage device with the highest utilization (i.e. the busiest storage device) is selected by the performance manager 121 in block B626.

In block B628, the storage device utilization is compared to a threshold value Y1 (for example, 85%). If the threshold value is reached, then in block B630, the process determines if the aggregate associated with the busiest storage device is under maintenance. This information may be maintained by the performance manager 121. If yes, then an event is triggered in block B632 providing aggregate maintenance information.

If the aggregate is not under maintenance, the performance manager determines if a Fibre Channel loop has reached a threshold value of Y2 (for example, 85%). The Fibre Channel loop includes a plurality of storage devices configured in a loop that are accessed by using Fibre Channel technologies. The busiest storage device may be a part of the Fibre Channel loop. Fibre Channel loop utilization data is maintained by the storage system node using a counter (not shown). If yes, then an event is triggered in block B636 indicating overutilization of the loop.

If the loop utilization has not reached Y2, then in block B638, the performance manager 121 determines if the remaining storage space at the storage device is less than a threshold value of Y3 (for example, 15%). This information is obtained from counter 412C as described above. If yes, then in block B640, an event is triggered indicating lack of free space.

In one aspect, a user is provided with reasons for aggregate overutilization. This allows remedial action that is associated with the reason for aggregate overutilization.

It is noteworthy that although the foregoing examples have been described with respect to the performance manager 121, the various adaptive functionality may be implemented by one or more processor executable application programming interface (API) that may be presented by the performance manager or other modules.

Figure 7:
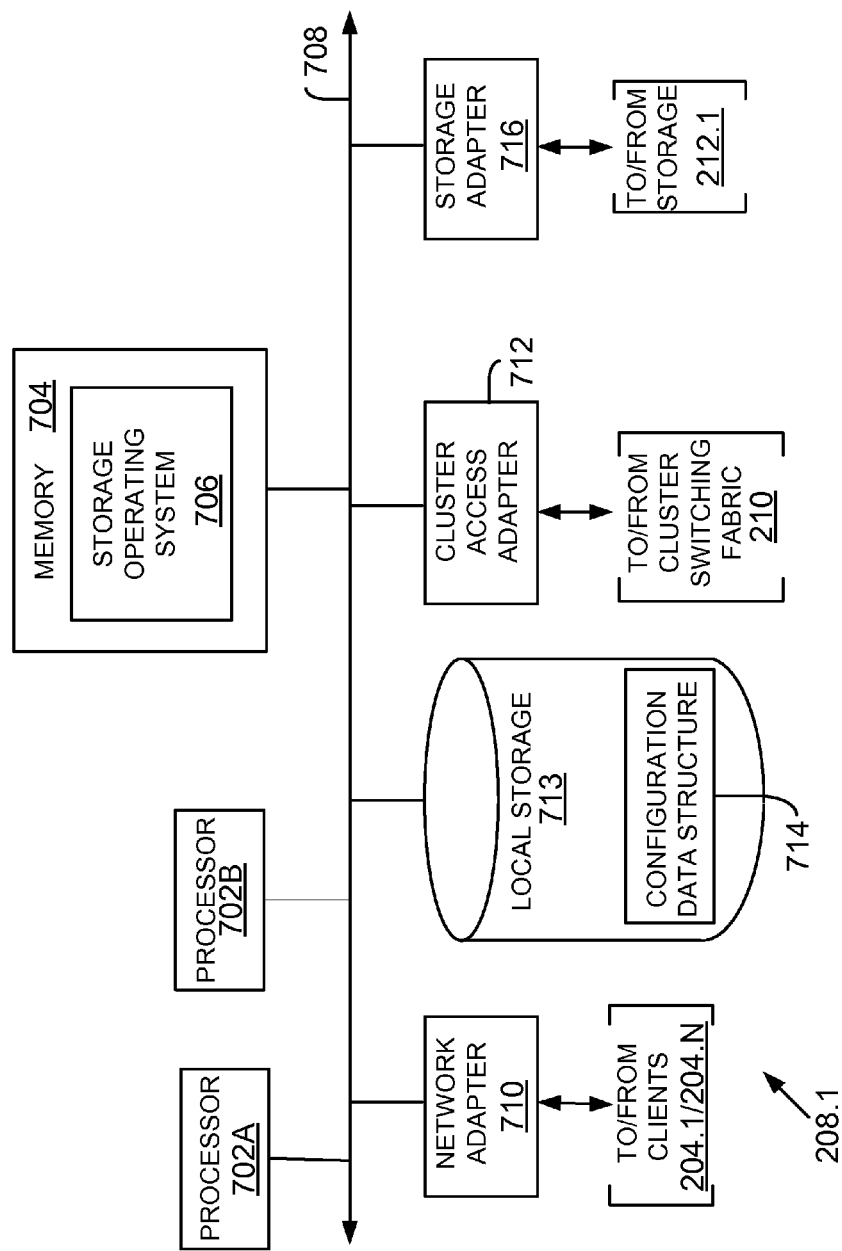
FIG. 7 shows an example of a storage system, used according to one aspect of the present disclosure.

Storage System Node: FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 717 interconnected by a system bus 708. Node 208.1 may be used to provide node and storage utilization information to performance manager 121 described above in detail.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Idle time for processors 702A-702A is tracked by counters 402A, described above in detail.

The local storage 713 comprises one or more storage devices utilized by the node to locally store configuration information for example, in a configuration data structure 714. The configuration information may include information regarding storage volumes and the QOS associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing a storage operating system 706 (similar to 107, FIG. 1) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 706 portions of which is typically resident in memory and executed by the processing elements, functionally organizes the node 208.1 by, inter alia, invoking storage operation in support of the storage service implemented by the node.

In one aspect, data that needs to be written is first stored at a buffer location of memory 704. Once the buffer is written, the storage operating system acknowledges the write request. As explained above, the written data is moved to NVRAM storage and then stored persistently.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
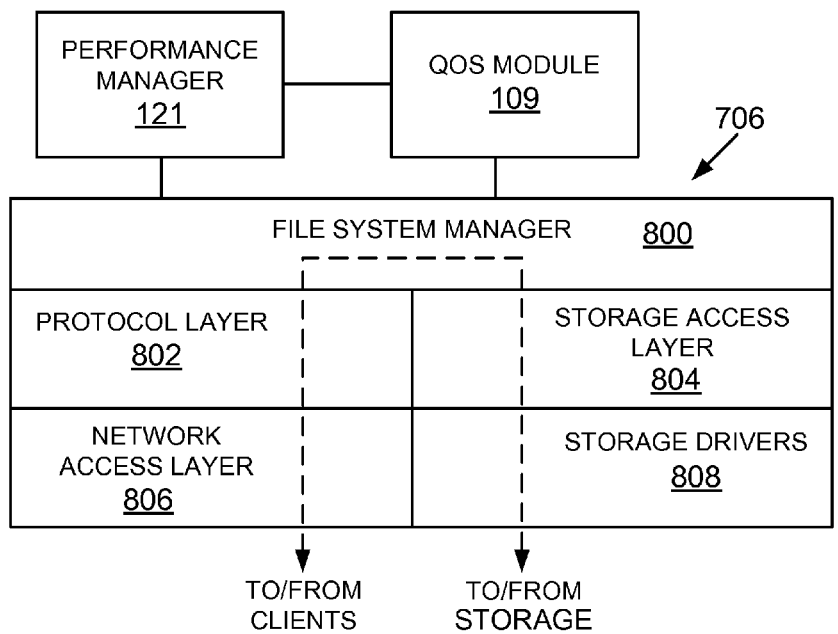
FIG. 8 shows an example of a storage operating system, used according to one aspect of the present disclosure.

Operating System:

FIG. 8 illustrates a generic example of storage operating system 706 (or 107, FIG. 1) executed by node 208.1, according to one aspect of the present disclosure. The storage operating system 706 interfaces with the QOS module 109 and the performance manager 121 such that proper bandwidth and QOS policies are implemented at the storage volume level. The storage operating system 706 may also maintain a plurality of counters for tracking node utilization and storage device utilization information. For example, counters 402A-402C and 412A-412C may be maintained by the storage operating system 706 and counter information is provided to the performance manager 121. In another aspect, performance manager 121 maintains the counters and they are updated based on information provided by the storage operating system 706.

In one example, storage operating system 706 may include several modules, or "layers" executed by one or both of network module 214 and storage module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow storage module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
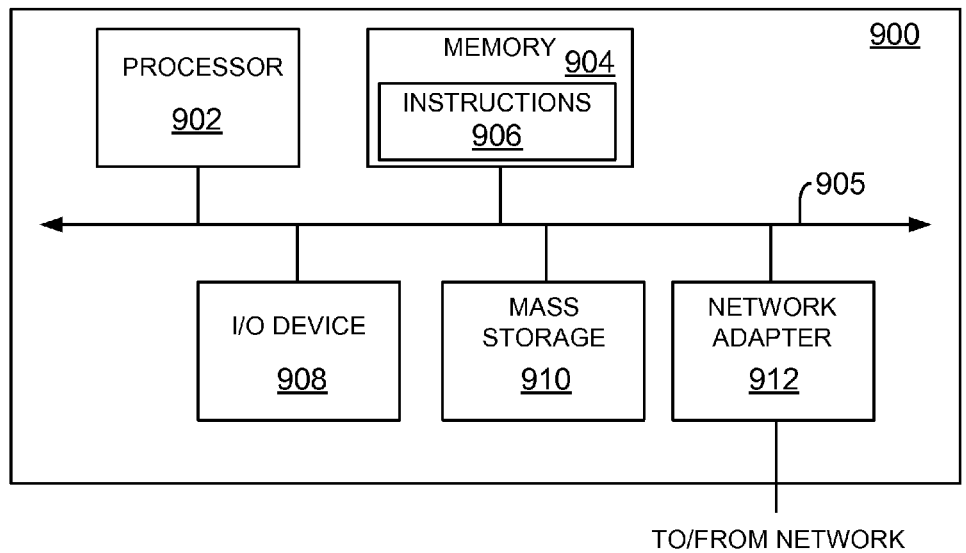
FIG. 9 shows an example of a processing system, used according to one aspect of the present disclosure.

Processing System: FIG. 9 is a high-level block diagram showing an example of the architecture of a processing system 900 that may be used according to one aspect. The processing system 900 can represent performance manager 121, host system 102, management console 118, clients 116, 204, or storage system 108. Note that certain standard and well-known components which are not germane to the present aspects are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps described above may reside in and executed by processors 902 from memory 904.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Thus, methods and apparatus for managing resources in a storage environment have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
determining by a management console a maximum node utilization of a first node operating in a networked storage environment for storing information at a plurality of storage devices, where the maximum node utilization is based on a first factor that tracks utilization of a processor of the first node by tracking idle time of the processor by the management console, a second factor that varies based on sequential and parallel operations executed by a storage operating system of the networked storage environment and a third factor that is based on a ratio of a duration for writing data in response to write requests to a non-volatile memory of the first node and a duration for flushing the data from the non-volatile memory to a storage device from among the plurality of storage devices; wherein the management console uses a processor utilization counter for tracking the first factor, a node operation counter for tracking the second factor and a write processing counter for tracking the third factor;
comparing the maximum node utilization to a first threshold value by the management console; and
triggering an event by the management console to reduce node utilization of the first node, when the maximum node utilization has reached the first threshold value.

2. The method of claim 1, further comprising:
determining by the management console a maximum node utilization for a second node that is configured to take over operations of the first node, when the first node becomes unavailable;
comparing by the management console node utilization of both the first node and the second node with a second threshold value; and
triggering an event by the management console to reduce node utilization of the first node and the second node, when the node utilization of both the first node and the second node has reached the second threshold value.

3. The method of claim 1, further comprising:
identifying by the management console a storage device from among the plurality of storage devices with a highest utilization.

4. The method of claim 3, further comprising
determining by the management console the duration for flushing a non-volatile memory of the first node as a percentage of total time a processor of the first node is operational; and
triggering an event by the management console to reduce the storage device utilization, when the duration for flushing has reached a third threshold value and the storage device with the highest utilization is fragmented.

5. The method of claim 3, wherein when the highest utilization has reached a fourth threshold value and free storage device space is below a certain level, then an event highlighting lack of free space is triggered by the management console.

6. The method of claim 1, wherein the management console tracks wait times for sequential and parallel operations for determining the second factor.

7. A non-transitory, machine readable storage medium having stored thereon instructions for performing a method, comprising machine executable code which when executed by at least one machine, causes the machine to:
determine by a management console a maximum node utilization of a first node operating in a networked storage environment for storing information at a plurality of storage devices, where the maximum node utilization is based on a first factor that tracks utilization of a processor of the first node by tracking idle time of the processor by the management console, a second factor that varies based on sequential and parallel operations executed by a storage operating system of the networked storage environment and a third factor that is based on a ratio of a duration for writing data in response to write requests to a non-volatile memory of the first node and a duration for flushing the data from the non-volatile memory to a storage device from among the plurality of storage devices; wherein the management console uses a processor utilization counter for tracking the first factor, a node operation counter for tracking the second factor and a write processing counter for tracking the third factor;

compare the maximum node utilization to a first threshold value by the management console; and trigger an event by the management console to reduce node utilization of the first node, when the maximum node utilization has reached the first threshold value.

8. The storage medium of claim 7, the machine executable code, further causes the machine to:

determine by the management console a maximum node utilization for a second node that is configured to take over operations of the first node, when the first node becomes unavailable;

compare by the management console node utilization of both the first node and the second node with a second threshold value; and trigger an event by the management console to reduce node utilization of the first node and the second node, when the node utilization of both the first node and the second node has reached the second threshold value.

9. The storage medium of claim 7, the machine executable code, further causes the machine to:

identify by the management console a storage device from among the plurality of storage devices with a highest utilization.

10. The storage medium of claim 9, the machine executable code, further causes the machine to:

determine by the management console the duration for flushing a non-volatile memory of the first node as a percentage of total time a processor of the first node is operational; and trigger an event by the management console to reduce the storage device utilization, when the duration for flushing has reached a third threshold value and the storage device with the highest utilization is fragmented.

11. The storage medium of claim 9, wherein when the highest utilization has reached a fourth threshold value and free storage device space is below a certain level, then an event highlighting lack of free space is triggered by the management console.

12. The storage medium of claim 7, wherein the management console tracks wait times for sequential and parallel operations for determining the second factor.

13. A system comprising:

a memory containing machine readable medium comprising machine executable code having stored thereon instructions; and a processor of a management console coupled to the memory, the processor configured to execute the machine executable code to:

determine a maximum node utilization of a first node operating in a networked storage environment for storing information at a plurality of storage devices, where the maximum node utilization is based on a first factor that tracks utilization of a processor of the first node by tracking idle time of the processor by the management console, a second factor that varies based on sequential and parallel operations executed by a storage operating system of the networked storage environment and a third factor that is based on a ratio of a duration for writing data in response to write requests to a non-volatile memory of the first node and a duration for flushing the data from the non-volatile memory to a storage device from among the plurality of storage devices; wherein a processor utilization counter tracks the first factor, a node operation counter tracks the second factor and a write processing counter for tracks the third factor;

compare the maximum node utilization to a first threshold value; and trigger an event to reduce node utilization of the first node, when the maximum node utilization has reached the first threshold value.

14. The system of claim 13, the machine executable code, further causes the machine to:

determine a maximum node utilization for a second node that is configured to take over operations of the first node, when the first node becomes unavailable;

compare node utilization of both the first node and the second node with a second threshold value; and trigger an event to reduce node utilization of the first node and the second node, when the node utilization of both the first node and the second node has reached the second threshold value.

15. The system of claim 13, the machine executable code, further causes the machine to:

identify a storage device from among the plurality of storage devices with a highest utilization.

16. The system of claim 15, the machine executable code, further causes the machine to:

determine the duration for flushing a non-volatile memory of the first node as a percentage of total time a processor of the first node is operational; and trigger an event to reduce the storage device utilization, when the duration for flushing has reached a third threshold value and the storage device with the highest utilization is fragmented.

17. The system of claim 15, wherein when the highest utilization has reached a fourth threshold value and free storage device space is below a certain level, then an event highlighting lack of free space is triggered by the management console.

18. The system of claim 13, wherein the management console tracks wait times for sequential and parallel operations for determining the second factor.

* * * * *